(No Model.)
C. H. LEGGETT.
INSECT POWDER DISTRIBUTER.
No. 376,600. Patented Jan. 17, 1888.
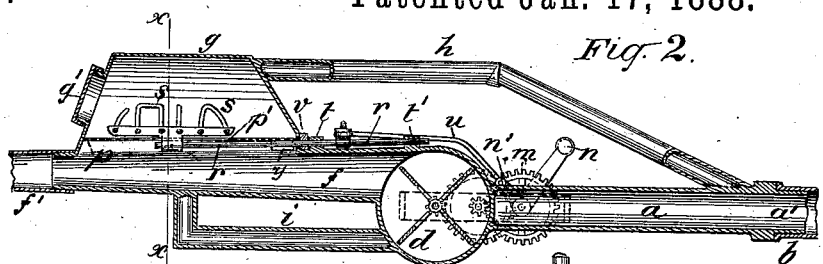
Fig. 2.
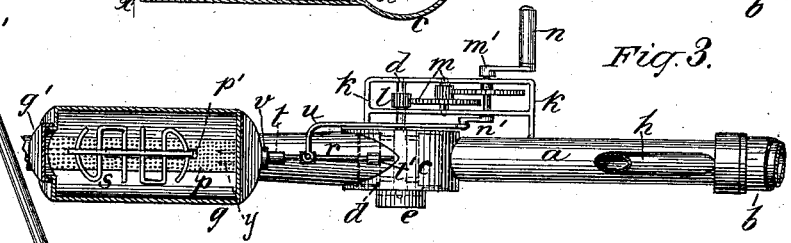
Fig. 3.
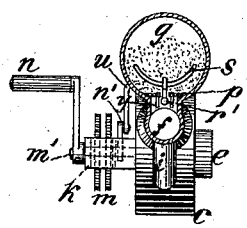
Fig. 4.
Fig. 1.
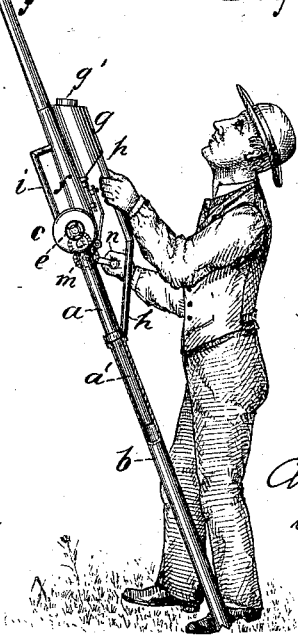
WITNESSES
John Becker
INVENTOR
Clinton H. Leggett.
by Chas. M. Higgins
Attorney.
N. PETERS, Photo-Lithographer, Washington, D. C.

UNITED STATES PATENT OFFICE.

CLINTON H. LEGGETT, OF NEW YORK, N. Y.

INSECT-POWDER DISTRIBUTER.

SPECIFICATION forming part of Letters Patent No. 376,600, dated January 17, 1888.

Application filed November 1, 1887. Serial No. 253,943. (No model.)

*To all whom it may concern:*

Be it known that I, CLINTON H. LEGGETT, of New York city, New York, have invented certain new and useful Improvements in Insect-Powder Distributers, of which the following is a specification.

My invention aims to provide an apparatus whereby insect-powder may be distributed economically and effectively over large areas of foliage, and particularly at a good height above the ground—such as on the under side of the leaves of fruit or shade trees suffering from the attacks of lice, worms, or other vermin—and it belongs to that class of insect-powder distributers which employ a rotary fan to produce a rapid current of air, and a powder-reservoir which feeds into said current, whereby the powder is distributed in a forceful and finely-divided manner.

Briefly, then, my invention may be stated to consist in mounting such rotary fan and powder-reservoir and their accompanying frame and operating mechanism upon a sustaining shaft or pole adapted to be rested upon the ground or in a belt about the waist of the operator, and in a long or extensible tube extending from the rotary fan to any desired height.

My invention further consists in an agitating device working over a sifting-plate within the powder-reservoir and operated in conjunction with the rotary fan, whereby the revolution of the latter by the operator will cause the agitator to perform its function of keeping the powder loose in the reservoir and feeding or sifting it gradually and evenly into the discharging-duct.

In the drawings annexed, Figure 1 gives a perspective view of my improved powder-distributer represented in action. Fig. 2 is an enlarged sectional view of the essential portions of the apparatus, and Fig. 3 is a sectional plan of the same. Fig. 4 is a cross-section on *x x*.

Referring to Figs. 1, 2, and 3, *a* indicates a column or staff forming the base of my apparatus, on which fits a removable post or tube, *b*, which may rest on the ground to firmly sustain the apparatus in the desired position, as seen in Fig. 1. The post *b* is preferably tubular throughout, its upper end fitting snugly over a tenon or neck, *a'*, on the staff *a*, while the lower end is preferably notched or spiked, as seen in Fig. 1, to engage firmly with the turf or ground and hold the apparatus steadily in place.

All parts of the apparatus are sustained from the staff *a*, which forms the base of the framework thereof, as seen best in Figs. 1 and 2, and on the top of the staff *a* is fixed the drum or casing *c* of a rotary fan, *d*, which is adapted to revolve rapidly within said casing, which has an air-inlet, *e*, at the center and an air-outlet at the periphery, from which the air-discharge tube or duct *f* extends, as shown. This discharge-duct *f* is widest at its connection with the drum and gradually tapers to its opposite end, which terminates in a narrow neck adapted to receive successive sections of tubes *f'*, to extend the duct to any length desired, as seen in Fig. 1, such tubes fitting one within the other at the ends in a well-known manner, as indicated in Figs. 1 and 2. Now upon the side of the discharge-tube *f*, and near the upper end thereof, is fixed the powder-reservoir *g*, which is preferably of a good size, sufficient to hold from one to two pounds of powder, so as to enable the apparatus to be used for a long period without recharging, and this reservoir has an opening at the top, through which the powder is introduced, and which is tightly closed by the cap *g*, to prevent escape of powder when the apparatus is in use. An angular or bracket-like tube, *h*, extends from the base of the staff *a* and is soldered in place at each end, thus forming a combined brace and handle to strengthen or stiffen the framework of the apparatus, and at the same time serve as a convenient handle by which to grasp and control the machine, as seen in Fig. 1. A second angular tube or brace, *i*, extends from the top of the fan-case *c* to the side of the tube *f*, which serves as a stiffening or strengthening brace merely, as will be understood from Figs. 1 and 2.

The entire frame or structure so far described is made entirely of sheet metal in the tubular form shown, which is therefore not only light and strong, but also inexpensive; but any other suitable material or form of construction may of course be used.

Referring now to Figs. 1, 2, and 3, it will be noted that the spindle of the fan *d* is journaled at each end in the drum or case *c*, and one end of the spindle projects from the closed end of the drum, and is further supported and journaled in the gear-frame $k$, secured to the side of the case $c$ and staff $a$, as best shown in Figs. 3, 2, and 4. On the spindle within the gear-frame is fixed the pinion $l$, which meshes with a train of wheels, $m$, mounted in said gear-frame, the leading axle $m$ of which is provided with the hand-crank $n$, by revolving which a very rapid rotary motion will be imparted to the fan $d$, so as to produce a strong air-blast through the tube $f\,f'$, as will be readily understood from Figs. 1 and 2.

Now the side of the reservoir $g$ communicates with the side of the air-tube $f$ through a series of perforations or a sieve, $p$, as best seen in Figs. 2, 3, and 4, which will thus admit the powder to the air-tube $f$ in a finely-divided state, which will be thence projected by the air-current through the tube $f$, and finally discharged at the end of the tube in a very fine state upon the vermin or upon the foliage to be protected. Within the reservoir, close to the sieve $p$, is arranged a feeder or agitator, $s$, designed to keep the powder agitated in the reservoir and prevent the same from becoming clogged or caked, and insuring its steady and uniform feed through the sieve into the air-tube. This agitator consists of wires bent in zigzag form and secured to a slide or cross-head which works in a narrow central slot, $p'$, in the sieve-plate $p$, as seen in Figs. 2, 3, and 4, and is connected to a reciprocating rod, $r$, which passes through the base of the reservoir and through two external guides or bearings, $t\,t'$, on the outside of the tube $f$. A pitman, $u$, is pivoted to the rod $r$ at a point between the bearings $t\,t'$, and is connected at the opposite end to a crank, $n'$, on the shaft $m'$. It will therefore be seen that when the hand-crank $m$ is revolved, as seen in Fig. 1, not only will the fan $d$ be revolved very rapidly in the case $c$, but the agitator $s$ will be reciprocated up and down in the powder-reservoir close to the feeding or sieve plate $p$, and will thus sift into the air-tube $f$ a finely-divided supply of powder, which will at once be taken up by and float in the air-current which is being simultaneously forced through the tube $f$ by the fan $d$, and in thus passing with the air through the tube $f$ and its long extensions $f'$ will become intimately mixed with and diffused through the air, and the two will be thence discharged at the tip or nozzle of the tube in a fine cloud-like condition, which by properly directing the nozzle can be discharged upon the insects on the under side of the foliage or at other points in a most effective manner. It will therefore be appreciated that by the combined means described I not only prevent the powder clogging in the reservoir or falling out in lumps, but I insure a positive and regular feed of the powder and cause it to fall into the air-current in a very finely-divided state, which not only greatly economizes the powder, but renders the destructive action of the powder on the insects far more effective, for it is obvious that by thus insuring the fine division and wide diffusion of the powder with the air the air-current is not only more thoroughly charged or saturated with the pungent or poisonous odor thereof, but, the mechanical particles of the powder being also so widely and finely diffused in this odorous air, more quickly reaches the spiracles or breathing apparatus of the insects, and hence both the clogging and toxical effect of the powder is thus rendered much more rapid and deadly, whereas powder discharged in a less diffuse manner would not have nearly so destructive an effect upon insect life either actually or as compared with the amount of powder used.

Referring to Figs. 2 and 3, it will be seen that I provide the rod $r$ where it issues from the reservoir with a packing-washer, $v$, preferably of leather or hide, fitting tightly between the reservoir and the bearing $t$, which being well oiled permits the rod to move freely, but prevents all escape of powder around the rod.

It may be readily understood that I do not limit myself to the exact form of the communication between the powder-reservoir and air-tube; but I prefer a sieve. Neither do I confine myself to the exact form of the agitator, as the form may vary considerably; but I prefer an agitator having arms which are curved or extended partly around the sides of the reservoir to or near the middle thereof, as well shown in Figs. 4, 2, and 3, so as to act not only on the powder near the sieve-plate, but also that on the sides of the reservoir and near the middle thereof, so as to keep the powder broken up in mass and prevent it caking against the walls of the reservoir. It may be also understood that I do not limit myself to the specific form of air-forcing device shown—that is, a rotary fan—though I consider this form preferable, and it is obvious that with this fan the driving-gearing $m$ may embody a greater or less number of wheels from that shown, according to the desired speed of rotation of the fan.

At $y$ in Figs. 2, 3, and 4 are seen small plates on each side of the rod $r$, which act to scrape off any accretions of powder thereon, and thus keep the rod clean before passing through the washer $v$.

What I claim as my invention is—

1. In a powder-distributer, the combination, with an air-forcing device and an air-ejecting tube leading therefrom, of a powder-reservoir communicating with the air-tube, and a sieve-plate in the connection, with an agitator working over the sieve in the reservoir and operating simultaneously with the air-forcing device, substantially as set forth.

2. A powder-distributer consisting in the combination, with a staff or pole, of an air-forcing device mounted thereon, an air-tube extending therefrom, and a powder-reservoir communicating with the air-tube, substantially as set forth.

3. The improved powder-distributer consisting of the combination of the supporting-staff, the air-forcing device, the extensible sectional air-tube extending therefrom, with the powder-reservoir discharging into the air-tube, the agitator working in the reservoir, and the manipulating device operatively connected to the agitator and air-forcing device to simultaneously actuate the same, substantially as set forth.

4. The combination of the staff $a$ and posts $b$, secured thereto, fan $c\ d$, mounted on post, air-tube $f$, leading from fan, reservoir $g$, communicating with air-tube, agitator $s$, reciprocating therein, wheel-train $m$, operating fan $c\ d$, and crank $m'$, operatively connected to wheel-train and agitator, substantially as set forth.

5. In a powder-distributer, the combination, with the fan $c\ d$ and air-tube $f$, of the reservoir $g$, discharging into air-tube, agitator $s$, working in reservoir, operating-rod $r$, pitman $u$, wheel-train $m$, and cranks $n\ n'$, substantially as shown and described.

6. In a powder-distributer, the combination, with the powder-reservoir, of an agitator, such as $s$, working therein and extending around the walls or sides of the reservoir to or about the middle thereof, substantially as and for the purpose set forth.

7. In a powder-distributer, the combination, with a powder-reservoir, of the agitator $s$, working therein, operating-rod $r$, connected to agitator, packing-washer $v$ on said rod, and bearing $t$, guiding the operating-rod, substantially as set forth.

8. The combination, with the supporting-staff $a$, of the fan $c\ d$, mounted thereon, the air-tube $f$, leading from fan, reservoir $g$, opening into air-tube, and brace $h$ between staff and reservoir, substantially as shown and described.

9. The combination, with the staff, of the fan $c\ d$, mounted thereon, air-tube $f$, leading from fan, reservoir $g$, opening into air-tube, and braces $h\ i$ between staff and reservoir and fan and air-tube, respectively, substantially as shown and described.

10. The combination, with the supporting staff or post, of the fan $c\ d$, mounted thereon, air-tube $f$, leading from fan, extensible sections $f'$, joined to air-tube, reservoir $g$, opening into air-tube, agitator $s$ in reservoir, wheel-train $m$, pitman $u$ between wheel-train and agitator, and cranks $n\ n'$, for operating wheel-train and pitman, substantially as shown and described.

CLINTON H. LEGGETT.

Witnesses:
 JNO. E. GAVIN,
 CHAS. M. HIGGINS.